(12) United States Patent
Christensen et al.

(10) Patent No.: US 7,747,447 B2
(45) Date of Patent: Jun. 29, 2010

(54) BROADCAST ROUTER HAVING A SERIAL DIGITAL AUDIO DATA STREAM DECODER

(75) Inventors: Carl Christensen, South Jordan, UT (US); Lynn Howard Arbuckle, Bountiful, UT (US)

(73) Assignee: Thomson Licensing, Boulogne-Billancourt (FR)

( * ) Notice: Subject to any disclaimer, the term of this patent is extended or adjusted under 35 U.S.C. 154(b) by 659 days.

(21) Appl. No.: 10/519,000

(22) PCT Filed: Jun. 20, 2003

(86) PCT No.: PCT/US03/19389

§ 371 (c)(1), (2), (4) Date: Dec. 21, 2004

(87) PCT Pub. No.: WO04/002040

PCT Pub. Date: Dec. 31, 2003

(65) Prior Publication Data

US 2005/0228646 A1    Oct. 13, 2005

Related U.S. Application Data

(60) Provisional application No. 60/390,357, filed on Jun. 21, 2002.

(51) Int. Cl.
*G10L 19/00* (2006.01)
(52) U.S. Cl. ............... 704/500; 704/200.1; 704/245; 700/94; 370/389; 369/124.08; 369/124.8
(58) Field of Classification Search ............... 704/201, 704/500; 381/94.4; 370/389; 369/124.08; 700/94
See application file for complete search history.

(56) References Cited

U.S. PATENT DOCUMENTS

| 4,837,831 | A | * | 6/1989 | Gillick et al. ............... 704/240 |
| 5,227,990 | A | | 7/1993 | Vaupel et al. |
| 5,245,667 | A | * | 9/1993 | Lew ............................ 381/94.4 |
| 5,258,999 | A | | 11/1993 | Wernimont et al. |
| 5,490,130 | A | * | 2/1996 | Akagiri .................. 369/124.08 |

(Continued)

FOREIGN PATENT DOCUMENTS

EP    453063 A2 * 10/1991

(Continued)

OTHER PUBLICATIONS

Search Report Dated May 27, 2004.

(Continued)

*Primary Examiner*—Richemond Dorvil
*Assistant Examiner*—Michael C Colucci
(74) *Attorney, Agent, or Firm*—Robert D. Shedd; Robert B. Levy

(57) ABSTRACT

A bi-phase decoder suitable for use in a broadcast router and an associated method for extracting subframes of digital audio data from a stream of digital audio data. Logical circuitry within the bi-phase decoder extracts subframes of the digital audio data by constructing a transition window from an estimated bit time, sampling the stream of digital audio data using a fast clock and applying the sampled stream of digital audio data to the transition window to identify transitions indicative of preambles of the subframes of digital audio data.

24 Claims, 6 Drawing Sheets

U.S. PATENT DOCUMENTS

| | | | |
|---|---|---|---|
| 5,727,074 A | | 3/1998 | Hildebrand |
| 5,956,674 A | * | 9/1999 | Smyth et al. ............. 704/200.1 |
| 6,104,996 A | * | 8/2000 | Yin ............................ 704/500 |
| 7,180,892 B1 | * | 2/2007 | Tackin ........................ 704/214 |
| 2003/0195645 A1 | * | 10/2003 | Pillay et al. .................. 700/94 |

FOREIGN PATENT DOCUMENTS

| | | |
|---|---|---|
| JP | 2000-105976 | 4/2000 |
| WO | WO 98/16040 | 4/1998 |
| WO | WO 9816040 A1 * | 4/1998 |
| WO | WO 02/47341 | 6/2002 |

OTHER PUBLICATIONS

Marco Angelici et al., "New Architecture for An AES-EBU Digital Audio Receiver", vol. 43, No. 3, Aug. 1, 1997, pp. 694-698, IEEE Transactions on Consumer Electronics, XP011083593.

Michiel M. Ligthart et al., "Design of a Digital Audio Input Output Chip", 19890515; 19890515-19890518, May 15, 1989, pp. 15.1/1-15.1/6, XP010082181, pp. 15.1/1-15.1/6, XP010082181.

(Supplementary European Search Report Attached dated: May 21, 2008).

* cited by examiner

BROADCAST ROUTER HAVING A SERIAL DIGITAL AUDIO DATA STREAM DECODER

CROSS REFERENCE

This application claims the benefit, under 35 U.S.C. §365 of International Application PCT/US03/19389, filed Jun. 20, 2003, which was published in accordance with PCT Article 21(2) on Dec. 31, 2003 in English and which claims the benefit of U.S. provisional patent application No. 60/390,357, filed Jun. 21, 2002.

FIELD OF THE INVENTION

The present invention relates to bi-phase decoders suitable for use in broadcast routers and, more particularly, to a bi-phase decoder and associated method for extracting 32-bit wide data subframes from an incoming AES-3 digital audio data stream.

BACKGROUND OF THE INVENTION

Traditionally, serial digital audio decoders have used a PLL to lock to the incoming signal. However, in order to use a PLL in a serial digital audio decoder, various external components are typically required. As a result, serial digital audio decoders which incorporate a PLL tend to be both expensive and unwieldy. Furthermore, PLLs cannot readily be switched between manufacturing technologies. As a result, PLLs are not particularly well suited for use in devices which integrate plural design technologies, for example, different FPGA families and/or different standard cell and gate array families.

SUMMARY OF THE INVENTION

The invention is directed to a bi-phase decoder and an associated method of extracting digital audio data words from a serialized stream of digital audio data. In accordance therewith, a transition window is constructed from an estimated bit time for the serialized stream of digital audio data. Plural digital audio data words are then extracted from the serialized stream of digital audio based upon the location of each transition in the serialized stream of digital audio data relative to a preamble sub-window and at least one data sub-window of the transition window. Each one of the extracted digital audio data words includes a preamble identifiable by a combination of at least one transition located in the preamble sub-window and at least one transition located in the at least one data sub-window. Depending on the specific combination of transition locations detected, the extracted data word may be further identified as having one of three different types of preambles. These combinations include a pair of successive transitions located in the preamble sub-window followed by a pair of successive transitions located in the at least one data sub-window, a pair of non-successive transitions located in the preamble sub-window separated by a pair of successive transitions located in the at least one data sub-window, and a transition located in the preamble sub-window followed by first, second and third transitions located in the at least one data sub-window.

DETAILED DESCRIPTION

Figure 1:
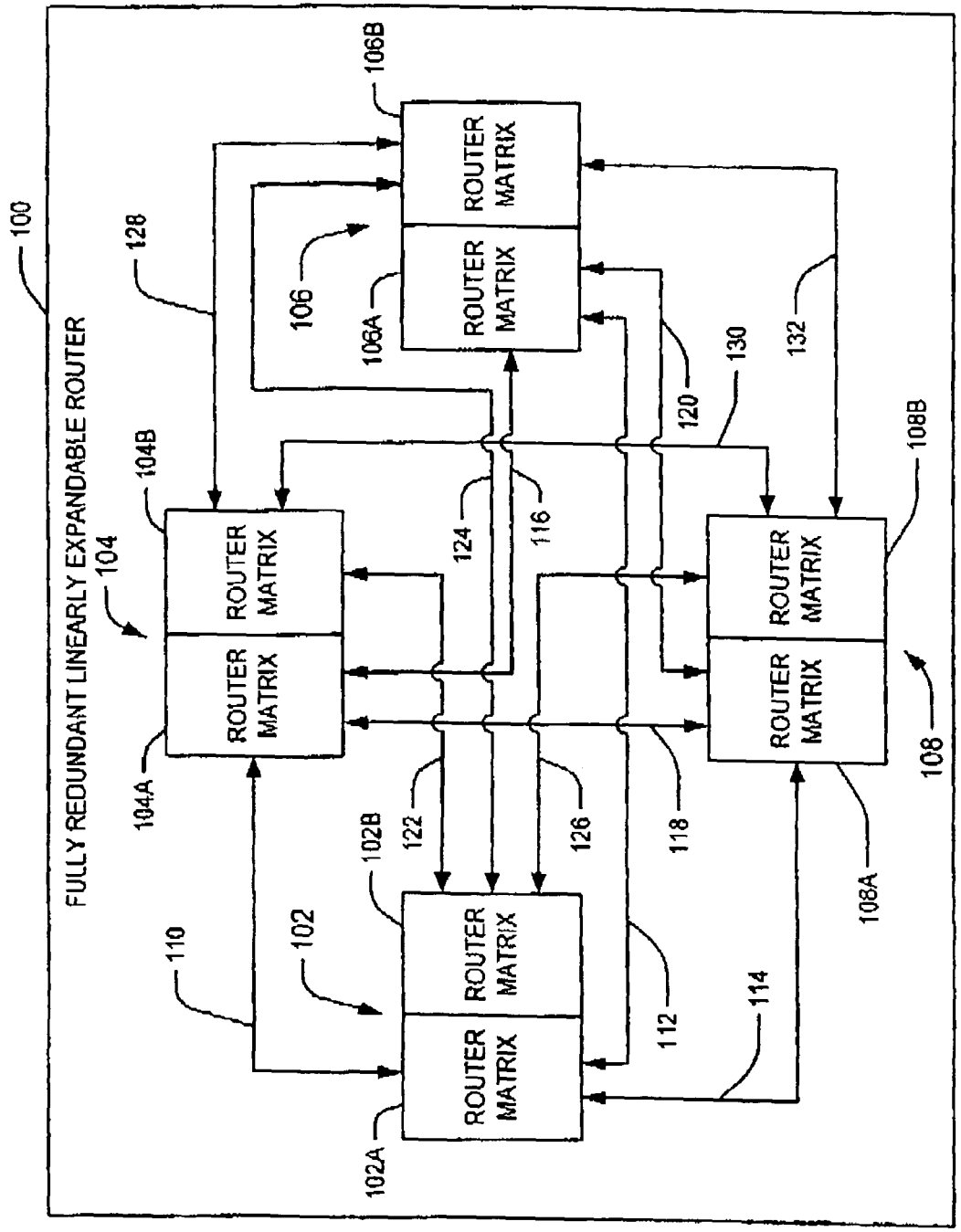
FIG. 1 is a block diagram of a fully redundant, linearly expandable broadcast router which incorporates a bi-phase decoder constructed in accordance with the teachings of the present invention.

Referring first to FIG. 1, a fully redundant, linearly expandable broadcast router 100 will now be described in greater detail. As may now be seen, the fully redundant, linearly expandable broadcast router 100 is comprised of plural broadcast router components coupled to one another to form the larger fully redundant linearly expandable broadcast router 100. Each broadcast router component is a discrete router device which includes first and second router matrices, the second router matrix being redundant of the first router matrix. Thus, each broadcast router has first and second routing engines, one for each of the first and second router matrices, each receiving, at an input side thereof, the same input digital audio data streams and placing, at an output side thereof, the same output digital audio data streams. As disclosed herein, each of the broadcast router components used to construct the fully redundant, linearly expandable broadcast router are N×M sized broadcast routers. However, it is fully contemplated that the fully redundant, linearly expandable broadcast router 100 could instead be constructed of broadcast router components of different sizes relative to one another.

As further disclosed herein, the fully redundant, linearly expandable broadcast router 100 is formed by coupling together first, second, third and fourth broadcast router components 102, 104, 106 and 108. Of course, the present disclosure of the fully redundant, linearly expandable broadcast router 100 as being formed of four broadcast router components is purely by way of example. Accordingly, it should be clearly understood that a fully redundant, linearly expandable broadcast router constructed in accordance with the teachings of the present invention may be formed using various other numbers of broadcast router components. The first, second, third and fourth broadcast router components 102, 104, 106 and 108 which, when fully connected in the manner disclosed herein, collectively form the fully redundant, linearly expandable broadcast router 100, may either be housed together in a common chassis as illustrated in FIG. 1 or, if desired, housed in separate chassis. While, as previously set forth, the broadcast router components 102, 104, 106 and 108 may have different sizes relative to one another or, in the alternative, may all have the same N×M size, one size that has proven suitable for the uses contemplated herein is 256×256. Furthermore, a suitable configuration for the fully redundant, linear expandable broadcast router 100 would be to couple five broadcast router components, each sized at 256×256, thereby resulting in a 1,280×1,280 broadcast router.

The first broadcast router component 102 is comprised of a first router matrix 102a and a second (or "redundant") router matrix 102b used to replace the first router matrix 102a in the event of a failure thereof. Similarly, each one of the second, third and fourth broadcast router components 104, 106, and 108 of the fully redundant, linearly expandable broadcast router 100 are comprised of a first router matrix 104a, 106a and 108a, respectively, and a second (or "redundant") router matrix 104b, 106b and 108b, respectively, used to replace the first router matrix 104a, 106a and 108a, respectively, in the event of a failure thereof. Of course, the designation of the second router matrices 102b, 104b, 106b and 108b as a redundant matrix for use as a backup for the first router matrices 102a, 104a, 106a and 108a, respectively, in the event of a failure thereof is purely arbitrary and it is fully contemplated that either one of a router matrix pair residing within a broadcast router component may act as a backup for the other of the router matrix pair residing within that broadcast router component.

As may be further seen in FIG. 1, the first router matrix 102a of the first broadcast router component 102, the first router matrix 104a of the second broadcast router component 104, the first router matrix 106a of the third broadcast router component 106 and the first router matrix 108a of the fourth broadcast router component 108 are coupled together in a first arrangement of router matrices which conforms to a fully connected topology. Similarly, the second router matrix 102b of the first broadcast router component 102, the second router matrix 104b of the second broadcast router component 104, the second router matrix 106b of the third broadcast router component 106 and the second router matrix 108b of the fourth broadcast router component 108 are coupled together in a second arrangement which, like the first arrangement, conforms to a fully connected topology. In a fully connected topology, each router matrix of an arrangement of router matrices is coupled, by a discrete link, to each and every other router matrix forming part of the arrangement of router matrices.

Thus, for the first arrangement of router matrices, first, second and third bi-directional links 110, 112 and 114 couples the first router matrix 102a of the first broadcast router component 102 to the first router matrix 104a of the second broadcast router component 104, the first router matrix 106a of the third broadcast router component 106 and the first router matrix 108a of the fourth broadcast router component 108, respectively. Additionally, fourth and fifth bi-directional links 116 and 118 couple the first router matrix 104a of the second broadcast router component 104 to the first router matrix 106a of the third broadcast router component 106 and the first router matrix 108a of the fourth broadcast router component 108, respectively. Finally, a sixth bi-directional link 120 couples the first router matrix 106a of the third broadcast router component 106 to the first router matrix 108a of the fourth broadcast router component 108.

Similarly, for the second arrangement of router matrices, first, second and third bi-directional links 122, 124 and 126 couples the second router matrix 102b of the first broadcast router component 102 to the second router matrix 104b of the second broadcast router component 104, the second router matrix 106b of the third broadcast router component 106 and the second router matrix 108b of the fourth broadcast router component 108, respectively. Additionally, fourth and fifth bi-directional links 128 and 130 couple the second router matrix 104b of the second broadcast router component 104 to the second router matrix 106b of the third broadcast router component 106 and the second router matrix 108b of the fourth broadcast router component 108, respectively. Finally, a sixth bi-directional link 132 couples the second router matrix 106b of the third broadcast router component 106 to the second router matrix 108b of the fourth broadcast router component 108. Variously, the bi-directional links 110 through 120 may be formed of copper wire, optical fiber or another transmission medium deemed suitable for the exchange of digital signals. Of course, rather than the single bi-directional links between pairs of broadcast router components illustrated in FIG. 1, in an alternate embodiment of the invention, it is contemplated that the pairs of broadcast router components may instead be coupled together by first and second uni-directional links. Such an alternate configuration is illustrated in FIG. 2.

The broadcast router components 102, 104, 106 and 108 will now be described in greater detail. FIG. 2 shows the first broadcast router component 102. The second, third and fourth broadcast router components 104, 106 and 108, on the other hand, are similarly configured to the first broadcast router component 102 and need not be described in greater detail. Of course, it should be clearly understood that certain components of the foregoing description of the first broadcast router component 102, as well as the second, third and fourth broadcast routers 104, 106 and 108 have been simplified for brevity of description. It is noted, however, that further details thereof may be found by reference to co-pending U.S. patent application Ser. No. 10/518,212 and previously incorporated by reference.

Figure 2:
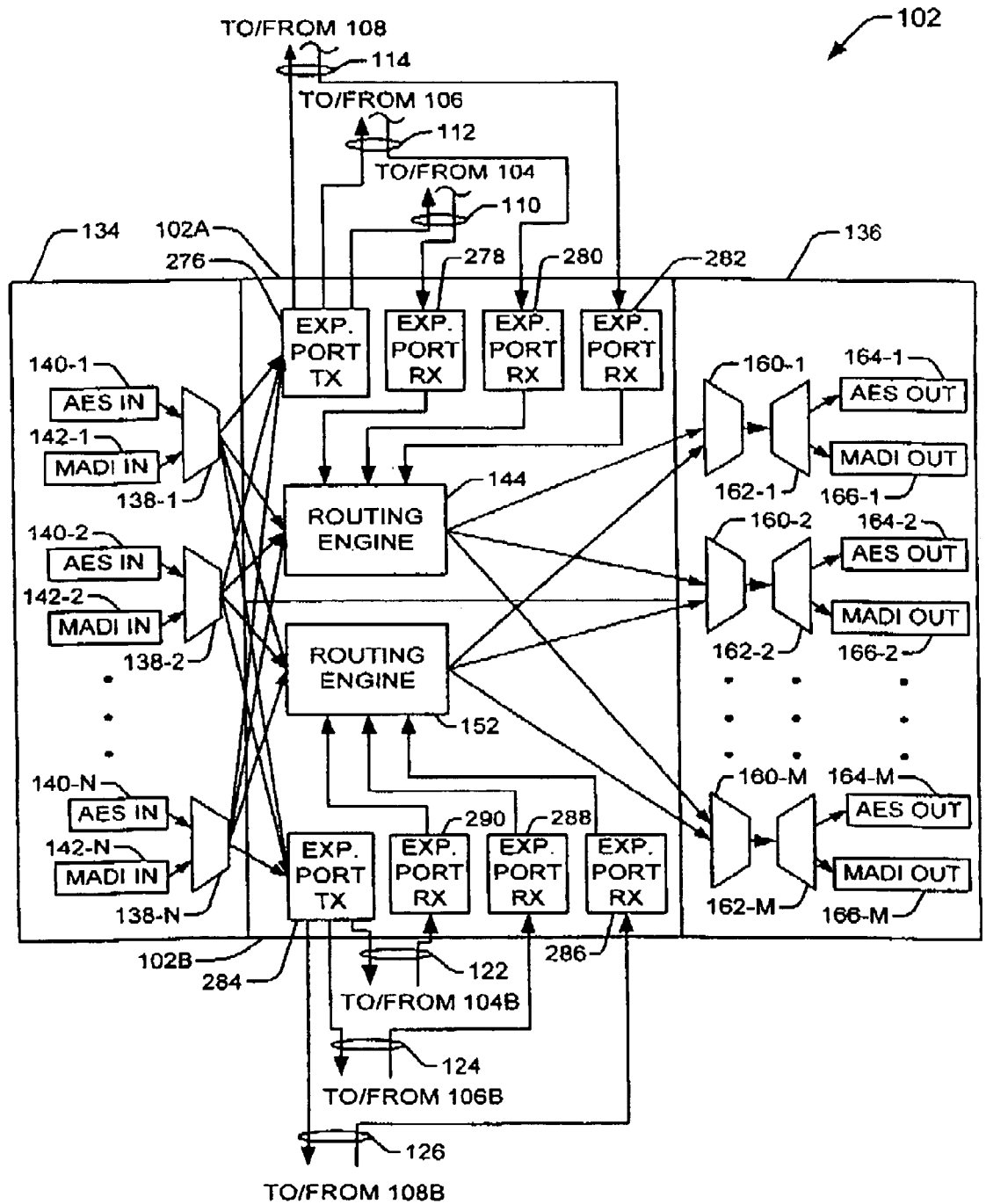
FIG. 2 is an expanded block diagram of a first broadcast router component of the fully redundant, linearly expandable broadcast router of FIG. 1.

As may be seen in FIG. 2, the broadcast router 102 includes N selectors 138-1 through 138-N arranged such that the output of each one of the selectors provides one of N transport streams to an input side of each one of the router matrices 102a, 102b of the first broadcast router component 102. As disclosed herein, each one of the selectors 138-1 through 138-N is a first 2:1 selector circuit having, as a first input thereto, a first transport stream built by an Audio Engineering Society ("AES") input circuit 140-1 through 140-N, respectively, and, as a second input thereto, a second transport stream built from a decoded digital audio data stream conforming to the multichannel digital audio ("MADI") standard by a MADI input circuit 142-1 through 142-N, respectively. Each one of the first selector circuits 138-1 through 138-N further includes a control input (not shown) for selecting between the two transport streams.

The selected transport stream output each one of the first selector circuits 138-1 through 138-N is fed to an input side of a routing engine 144, a transmitting (or "TX") expansion port 276, a first receiving (or "RX") expansion port 278, a second receiving expansion port 280 and a third receiving expansion port 282 of the first router matrix 102a. By the term "transmitting" expansion port, it is intended to refer to an expansion port from which data is transmitted to a selected destination. Similarly, by the term "receiving" expansion port, it is intended to refer to an expansion port which receives data from a destination. In a broad sense, the transmitting expansion port 276 of the first router matrix 102a is comprised of a memory subsystem in which the transport streams received from the first selector circuits 138-1 through 138-N of the first broadcast router component 102 are buffered before transfer to plural destinations and a processor subsystem for controlling the transfer of the transport streams received from the first selector circuits 138-1 through 138-N to a receiving expansion port of the first router matrix 104a of the second broadcast router component 104, the first router matrix 106a of the third broadcast router component 106 and the first router matrix 108a of the fourth broadcast router component 108. Conversely, each one of the first, second and third expansion ports 278, 280 and 282 of the first router matrix 102a are, in a broad sense, comprised of a memory subsystem in which input transport streams received from a transmitting expansion port of the first router matrix of another broadcast router component may be buffered before transfer to their final destination and a processor subsystem for controlling the transfer of the input transport streams received from the transmitting expansion port of the first router matrix of the other broadcast router component to inputs of the routing engine 144 of the first router matrix 102a of the first broadcast router component 102.

From the first selector circuits 138-1 through 138-N, transport streams 1 through N containing information extracted from AES input 1-32N and/or MADI inputs 1-N are transmitted to the routing engine 144 and the transmission expansion port 276. From the transmission expansion port 276, input transport streams 1 through N are forwarded to the first router matrix 104a of the second broadcast router component 104 over the link 110, to the first router matrix 106a of the third broadcast router 106 over the link 112 and to the first router matrix 108a of the fourth broadcast router 108 over the link 114. In return, input transport streams N+1 through 2N are transmitted, from the transmission expansion port of the first router matrix 104a of the second broadcast router component 104, to the first receiver expansion port 278 over the link 110; input transport streams 2N+1 through 3N are transmitted, from the transmission expansion port of the first router matrix 106a of the third broadcast router component 106, to the second receiver expansion port 280 over the link 112; and input transport streams 3N+1 through 4N are transmitted, from the transmission expansion port of the first router matrix 108a of the fourth broadcast router component 108, to the third receiver expansion port 282 over the link 114. Finally, input transport streams N+1 through 2N, 2N+1 through 3N and 3N+1 through 4N are input, by the first, second and third receiver expansion ports 278, 280 and 282, respectively, the routing engine 144.

As previously set forth, the first and second router matrices 102a and 102b are redundant matrices relative to one another. To function in this manner, routing engine 152 of the second router matrix 102b must have the same set of input transport streams as the routing engine 144. Accordingly, in a fashion like that hereinabove described, the selected transport streams output each one of the first selector circuits 138-1 through 138-N are also fed to an input side of the routing engine 152 as well as a transmitting port 284. Similarly, the transport streams fed to the first receiving expansion port 278, the second receiving expansion port 290 and the third receiving expansion port 282 are also fed to a first receiving expansion ports 286, a second receiving expansion port 288 and a third receiving expansion port 290, respectively, of the second router matrix 102b. In a broad sense, the transmitting expansion port 284 of the second router matrix 102b is comprised of a memory subsystem in which the transport streams received from the first selector circuits 138-1 through 138-N of the first broadcast router component 102 are buffered before transfer to plural destinations and a processor subsystem for controlling the transfer of the transport streams received from the selector circuits 138-1 through 138-N to a receiving expansion port of the second router matrix 104b of the second broadcast router component 104, the second router matrix 106b of the third broadcast router component 106 and the second router matrix 108b of the fourth broadcast router component 108. Conversely, each one of the first, second and third expansion ports 286, 288 and 290 of the second router matrix 102b are, in a broad sense, comprised of a memory subsystem in which the transport streams received from a transmitting expansion port of the first router matrix of another broadcast router component may be buffered before transfer to their final destination and a processor subsystem for controlling the transfer of the transport streams received from the transmitting expansion port of the first router matrix of the other broadcast router component to inputs of the routing engine 152 of the second router matrix 102b of the first broadcast router component 102.

From the first selector circuits 138-1 through 138-N, input transport streams 1 through N are transmitted to the routing engine 152 and the transmission expansion port 284. From the transmission expansion port 284, input transport streams 1 through N are forwarded to the second router matrix 104b of the second broadcast router component 104 over the link 122, to the second router matrix 106b of the third broadcast router 106 over the link 124 and to the second router matrix 108b of the fourth broadcast router 108 over the link 126. In return, input transport streams N+1 through 2N are transmitted, from the transmission expansion port of the second router matrix 104b of the second broadcast router component 104, to the third receiver expansion port 290 over the link 122; input transport streams 2N+1 through 3N are transmitted, from the transmission expansion port of the second router matrix 106b of the third broadcast router component 106, to the second receiver expansion port 288 over the link 124; and input transport streams 3N+1 through 4N are transmitted, from the transmission expansion port of the second router matrix 108b of the fourth broadcast router component 108, to the first receiver expansion port 288 over the link 126. From the third, second and first receiver expansion ports 290, 288 and 286, the input transport streams N+1 through 2N, 2N+1 through 3N and 3N+1 through 4N are transmitted, by the third, second and first receiver expansion ports 290, 288 and 286, respectively, to the routing engine 154.

Residing within the routing engine 144 of the first router matrix 102a is switching means for assigning any one of the 4N AES streams received as inputs to the routing engine 144 to any one of the M output lines of the routing engine 144. Variously, it is contemplated that the routing engine 144 may be embodied in software, for example, as a series of instructions; hardware, for example, as a series of logic circuits; or a combination thereof. Similarly, residing within the routing engine 152 of the second router matrix 102b is switching means for assigning any one of the 4N input AES streams received as inputs to the routing engine 152 to any one of the M output lines of the routing engine 152. Again, it is contemplated that the routing engine 152 may be variously embodied in software, hardware or a combination thereof. Each one of the 1 through M AES streams output the routing engines 144 and 152 of the first and second routing matrices 102a and 102b, respectively, of the first broadcast router component 102 are propagated to a corresponding one of second selector circuits 160-1 through 160-M. The second selector circuits 160-1 through 160-M collectively determine whether the 1 through M AES streams output the routing engine 144 of the first routing matrix 102a or the 1 through M AES streams output the routing engine 152 of the second routing matrix 102b shall be the output of the first broadcast router component 102. Each one of the second selector circuits 160-1 through 160-M share a common control input (not shown) for selecting whether the AES streams output the routing engine 144 or the AES streams output the routing engine 152 shall be passed by the second selector circuits 160-1 through 160-M.

From the second selector circuits 160-1 through 160-M, the selected AES streams are propagated to a respective one of information duplication circuits 162-1 through 162-M. In turn, the information duplication circuits 162-1 through 162-M pass the received AES streams to either the AES output circuits 164-1 through 164-M or the MADI output circuits 166-1 through 166-M for encoding and output from the first broadcast router component 102. Similarly, if the received information streams were MADI streams, they, too, could be passed to either the AES output circuits 164-1 through 164-M or the MADI output circuits 166-1 through 166-M for encoding and output from the first broadcast router component 102.

Figure 3:
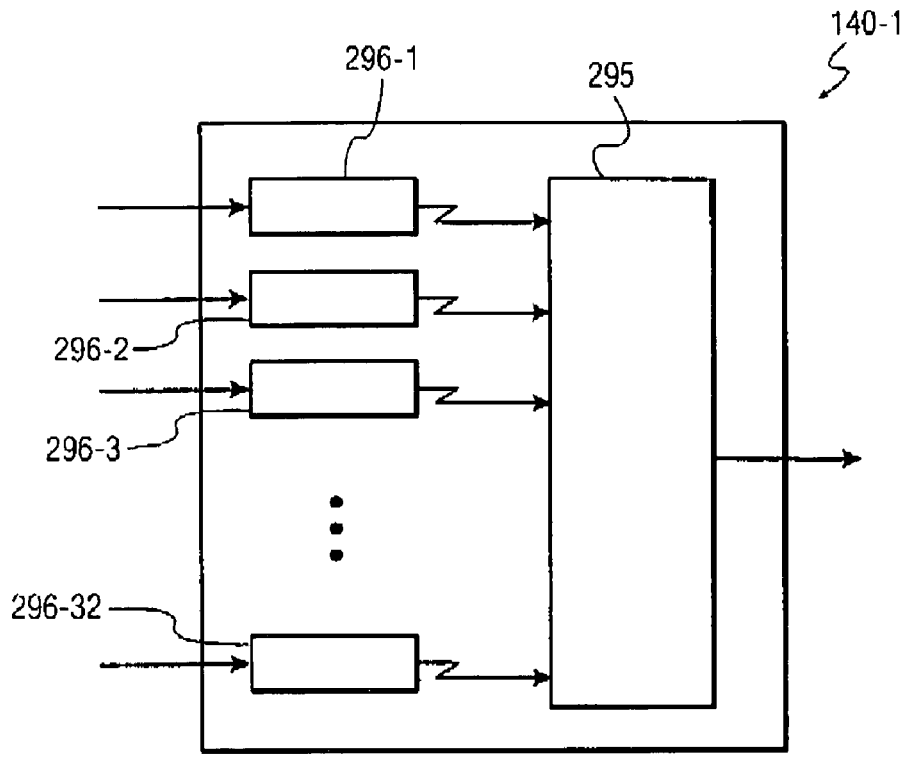
FIG. 3 is an expanded block diagram of an AES input circuit of the first broadcast router component of FIG. 2.

Referring next to FIG. 3, the AES input circuits 140-1 through 140-N will now be described in greater detail. FIG. 3 shows the AES input circuit 140-1. The remaining AES input circuits, specifically, the AES input circuits 140-2 through 140-N are similarly configured to the AES input circuit 140-1 and need not be described in greater detail. As may now be seen, the AES input circuit 140-1 includes AES bi-phase decoder circuits 296-1 through 296-32 and a transport stream multiplexer 295. Input to each one of the AES bi-phase decoder circuits 296-1 through 296-32 is a respective input digital audio data stream, conforming to the AES-3 standard, and originating at a signal source (not shown). As will be more fully described below, the AES bi-phase decoder circuits 296-1 through 296-32 decodes the respective input digital audio data stream input thereto. The resulting 32 decoded input digital audio data streams produced by the AES bi-phase decoder circuits 296-1 through 296-32 are input the transport stream multiplexer 295 which builds, from the 32 decoded input digital audio data streams, an input transport stream which is passed to the selector circuit 138-1.

Figure 4:
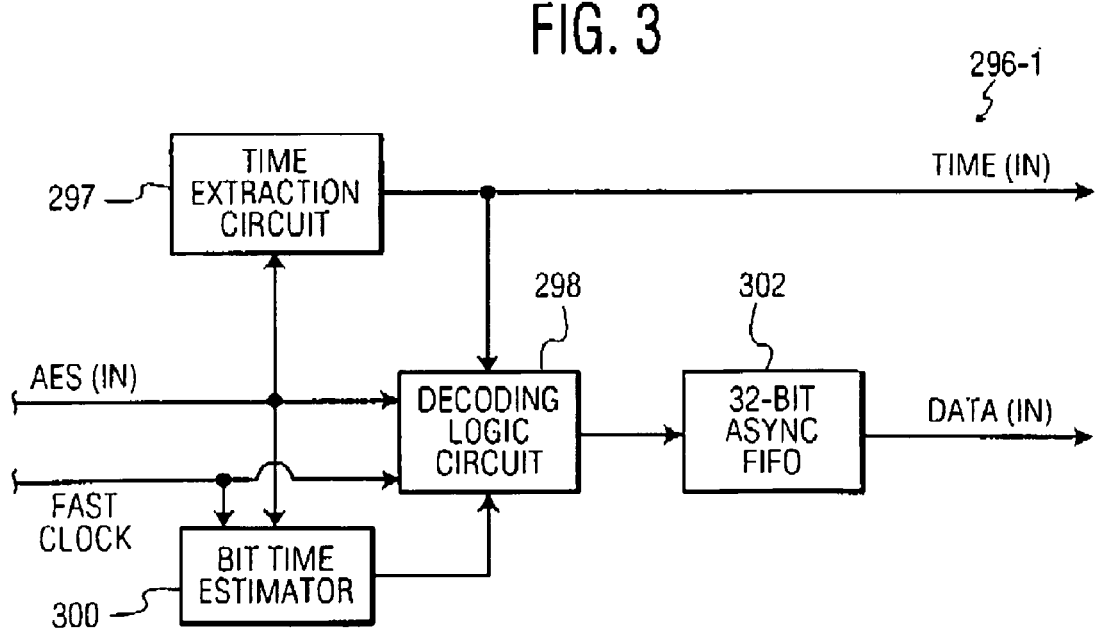
FIG. 4 is an expanded block diagram of an AES bi-phase decoder circuit of the AES input circuit of FIG. 3.

The AES bi-phase decoder circuits 296-1 through 296-32 will now be described in greater detail. FIG. 4 shows the AES bi-phase decoder circuit 296-1. The remaining AES bi-phase decoder circuits, specifically, the AES bi-phase decoder circuits 296-2 through 296-32 are similarly configured to the AES bi-phase decoder circuit 296-1 and need not be described in greater detail. As will be more fully described below, the AES bi-phase decoder 296-1 works by using a fast clock to sample an incoming data stream, here, the AES serialized digital audio data stream. In order to decode the AES serialized digital audio data stream, the AES bi-phase decoder 296-1 also requires an estimated bit time. As used herein, the term "fast clock" refers to a clock having a frequency of at least twenty times faster than the frequency of the incoming AES digital audio data stream. The term "bit time", on the other hand, refers to the number of fast clocks that will occur during a typical bit of the incoming AES digital audio data stream. As disclosed herein, it is contemplated that the AES bi-phase decoder 296-1 may operate in two modes. In the first mode, the bit time is user-selected for direct input to the logic circuit 298 while, in the second mode, the bit time is automatically generated from the incoming serialized digital audio data stream.

As may be seen in FIG. 4, the AES bi-phase decoder 296-1 is comprised of a time extraction circuit 297, a decoding logic circuit 298, a bit time estimator 300 and an appropriately sized data store, for example, a 32-bit wide asynchronous first-in-first-out ("FIFO") memory 302. The AES bi-phase decoder 296-1 receives the serialized digital audio data stream of AES data from the AES input 140-1. Within the AES bi-phase decoder 296-1, the AES serialized digital audio data stream is then routed to each of the time extraction circuit 297, the decoding logic circuit 298 and the bit time estimator 300. The time extraction circuit 297 extracts certain time information, specifically, the number of fast clocks separating successive preambles from the second serialized digital audio data stream. The time extraction circuit 297 then passes the extracted time information to the decoding logic circuit 298 for decoding of the AES serialized digital audio data stream. Further details regarding the operation of the time extraction circuit 297 are set forth in greater detail in co-pending U.S. patent application Ser. No. 10/518,569 and previously incorporated by reference. In addition to passing the extracted time information to the decoding logic circuit 298, the time extraction circuit 297 also passes the extracted time information to a selector circuit (not shown), having a control input tied to the control input for the selector circuit 138-1, which selects either the time information extracted from the AES serialized digital audio data stream on input 140-1 or the time information extracted from the AES serialized digital audio data stream on input 142-1 for forwarding to the routing engines 144 and 152.

Figure 5:
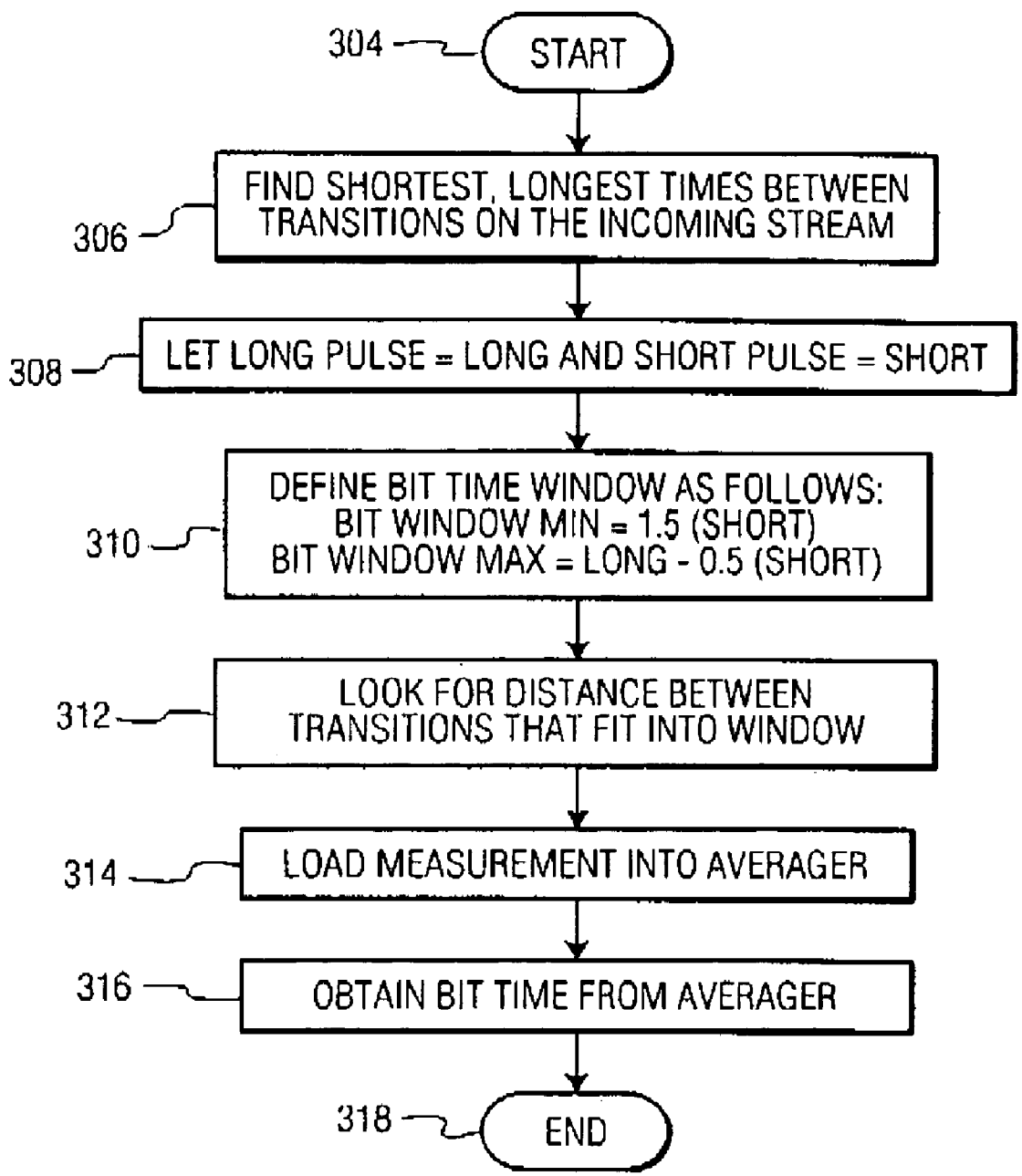
FIG. 5 is a flow chart of a method by which a bit time estimator of the AES bi-phase decoder of FIG. 4 determines an estimated bit time for an AES-3 serial digital audio data stream.

If the AES bi-phase decoder 296-1 is operating in the second mode, the bit time estimator 300 will determine an estimated bit time from the AES serialized digital audio data stream received thereby. Referring momentarily to FIG. 5, the method by which the bit time estimator 300 determines an estimated bit time will now be described in greater detail. In one aspect, the bit time estimator 300 may be a discrete electronic component with sufficient processing capacity to execute the algorithm described herein. Alternately, the bit time estimator 300 may be physically incorporated, together with any number of other components of the AES bi-phase decoder 296-1, into a single processor unit which would execute the algorithm described herein as a subroutine thereof.

The method of determining an estimated bit time commences at step 304 and, at step 306, the serialized digital audio data stream received by the bit time estimator 300 is examined and the shortest and longest times between successive transitions in the incoming stream are identified. At step 308, the value "long" is set to the duration of the pulse having the longest time between transitions while the value "short" is set to the duration of the pulse having the shortest time between transitions. Proceeding on to step 310, minimum and maximum values are selected for a bit time window as follows:

Bit window (min)=1.5(short); and

Bit window (max)=long−0.5(short).

It should be noted that this process will identify a bit time window even if the received serialized digital audio data stream contains only zeros. More specifically, and as will be more fully described in Table I, below, each subframe of data is headed by a preamble comprised of four pulses of irregular duration. Thus, even in the absence of any data contained within the received serialized digital audio data stream, minimum and maximum values for the bit time window may be calculated from the times between the transitions which form the pulses of the preamble.

Having defined a bit time window, the method proceeds to step 312 where the serialized digital audio data stream is again examined, this time for successive transitions which fit within the defined window. Upon detection of a pulse having a duration which fits within the bit time window, the duration of the detected pulse is loaded into an averager (not shown) at step 314 and, at step 316, the averager calculates, from plural detected pulses, a 32-sample running average as follows:

$$AVE_{(0)} = X_{(0)} + X_{(-1)} + X_{(-2)} + X_{(-3)} + \ldots + X_{(-31)}/32.$$

where: X is the duration of a detected pulse fitting within the defined window; and $AVE_{(O)}$ is the estimated bit time duration.

For subsequent detections of a pulse fitting within the defined window, the estimated bit time duration is calculated as follows:

$$AVE_{(O)}=(X_{(O)}/32)+AVE_{(-1)}-(X_{(-32)}/32).$$

Thus, the estimated bit time duration is recalculated for each subsequently detected pulse and, in such subsequent calculation, the duration of the subsequently detected pulse is used in place of the oldest pulse previously used to calculate the estimated bit time duration. Upon calculation (or recalculation, as appropriate) of the estimated bit time, the bit time estimator 300 forwards the calculated value to the decoding logic circuit 298 where it is used, in the manner to be more fully described below, by the decoding logic circuit 298, to decode the received AES serialized digital audio data stream.

It should be noted that, by using a running average for estimated bit time duration, small changes, typically caused by fast jitter, are smoothed out but larger changes, typically caused by wander or varispeed operation, are tracked. Alternately, the average estimated bit time duration may be pre-loaded. In this mode, a pre-loaded value is inserted for all 32 samples. By combining the use of a pre-loaded value with circuitry to watch for loss or reestablishment of signal, the AES bi-phase decoder 296-1 may quickly adjust to a new signal of a different sampling rate. For example, upon detection of a new signal by the aforementioned signal reestablishment circuitry, the bit-time estimator 300 may determine a new bit time window for the new signal and, upon detection of a first pulse which fits within the newly determined bit time window, insert the duration of the detected pulse as the preload value for all 32 samples.

Figure 6:
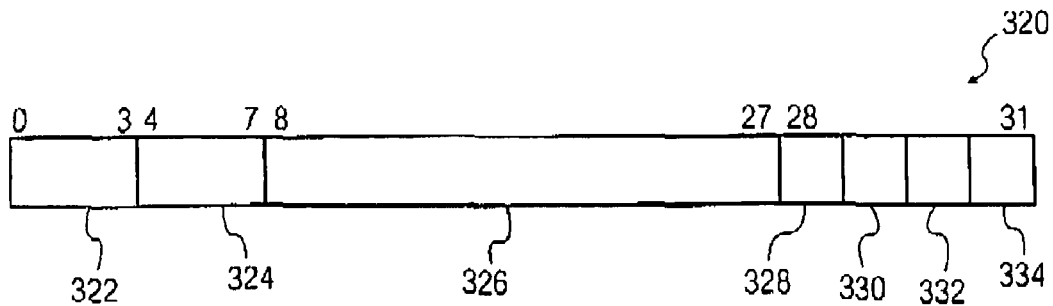
FIG. 6 is a block diagram of a subframe of AES-3 serial digital audio data.

Before providing further details on the operation of the AES bi-phase decoder 296-1 illustrated in FIG. 4, a brief discussion of the AES standard for serialized digital audio signals will be helpful. In accordance with the AES standard, information is carried in a fixed structure known as a subframe. A sequence of two successive and associated subframes is a frame and a group of 192 consecutive frames is a block. A subframe, more specifically, subframe 320 is illustrated in FIG. 6. The subframe 320 is comprised of 32 time slots. Time slots 0 to 3 carry a preamble 322 for the subframe 320. Time slots 4 to 27 carry an audio sample word in linear 2's complement representation. When a 24-bit coding range is used, the least significant bit ("LSB") is in time slot 4. When, as illustrated in FIG. 6, a 20-bit coding range is sufficient, time slots 8 to 27 carry audio sample word 326 with the LSB in time slot 8. Time slots 4 to 7 may be used for other applications and are typically designated as auxiliary sample bits 324. Time slot 28 carries validity bit 328 for the audio sample word 326. Time slot 29 carries user data bit 330 for the user data channel associated with the audio channel transmitted in the subframe 320. Time slot 30 carries channel status bit 332 of the channel status information associated with the audio channel transmitted in the same subframe 320. Time slot 31 carries parity bit 334 such that time slots 4 to 31 inclusive will carry an even number of ones and an even number of zeros.

Figure 7:
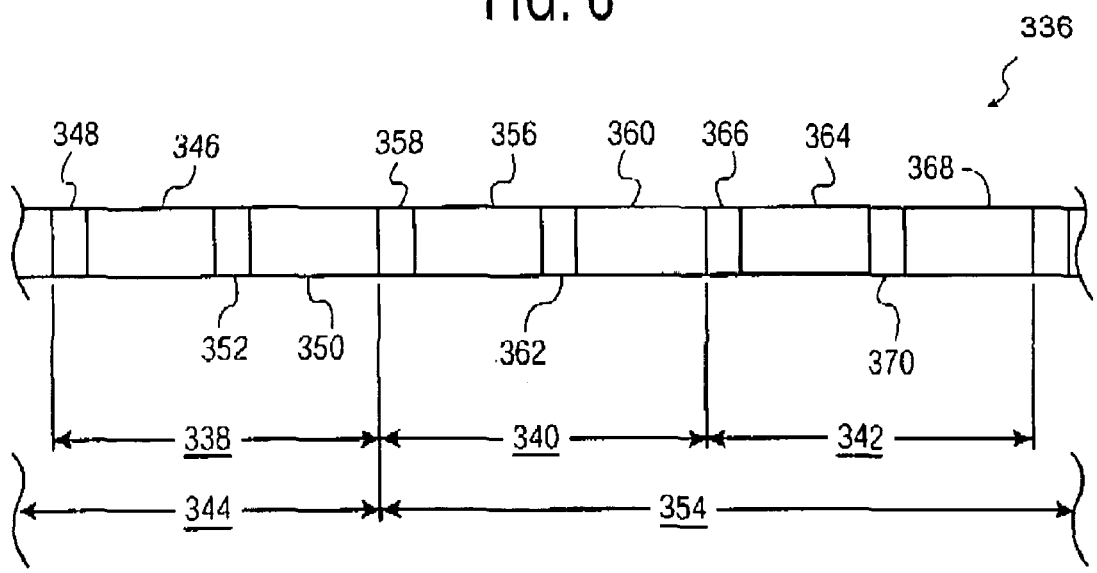
FIG. 7 is a block diagram of a stream of AES-3 serial digital audio data.

In further accordance with the AES standard, the preamble 322 for the subframe 320 may be one of three types—"X", "Y" or "Z". The first subframe of a frame normally starts with preamble "X". To define the block structure used to organize the channel status information, the preamble changes to preamble "Z" once every 192 frames. The second subframe of the frame, on the other hand, always starts with preamble "Y". For example, FIG. 7 illustrates an AES data stream which includes first, second and third frames 338, 340 and 342. The frame 338 is the $192^{nd}$ frame of data block 344. Accordingly, first subframe 346 of the frame 338 is headed by an "X" type preamble 348 while second subframe 350 of the frame 338 is headed by a "Y" type preamble 352. Conversely, the frame 340 is the first frame of data block 354. Accordingly, first subframe 356 of the frame 340 is headed by a "Z" type preamble 358 while second subframe 360 of the frame 340 is headed by a "Y" type preamble 362. Finally, the frame 342 is the $2^{nd}$ frame of the data block 354. Accordingly, first subframe 364 of the frame 342 is headed by an "X" type preamble 366 while second subframe 368 of the frame 342 is headed by a "Y" type preamble 370.

Figure 8:
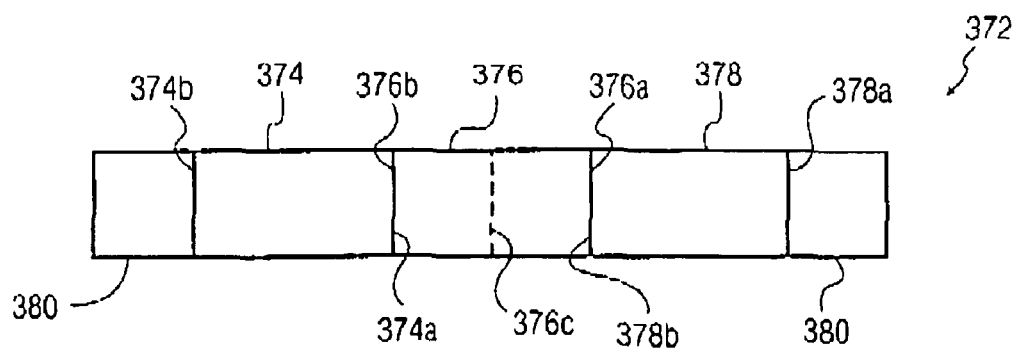
FIG. 8 is a block diagram of a transition window constructed using the estimated bit time determined by the method of FIG. 5.

Whether generated by the bit time estimator 300 or otherwise provide to the decoding logic circuit 298, the decoding logic circuit 298 uses the estimated bit time to generate a timing window 372 diagrammatically illustrated in FIG. 8. The timing window 372 includes a first (or "ones") sub-window 374, a second (or "ones/zero") sub-window 376, a third (or "preamble") sub-window 378 and a fourth (or "out of range") sub-window 380. To produce the timing window 372, each one of the first, second and third sub-windows 374, 376 and 378 are sized to have a duration of ½ bit times. Center line 376c of the second sub-window 376 is then assigned a value of one bit time. Accordingly, upper boundary 376a of the second sub-window 376 is 1¼ bit times while lower boundary 376b of the second sub-window 376 is ¾ bit times. Similarly, upper boundary 374a of the first sub-window 374 would be ¾ bit times, lower boundary 374b of the first sub-window 374 would be ¼ times, lower boundary 378b of the third sub-window 378 would be 1¼ bit times and upper boundary 378a of the third sub-window 378 would be 1¾ bit times. Finally, the fourth sub-window would encompass all bit times below ¼ time or above 1¾ bit time. As to be more fully described below, the timing window 372 is used to decode the serialized digital audio data stream input the logic circuit 298. Briefly, however, the incoming serialized digital audio data stream is superimposed against the timing window 372 and, based upon which of the sub-windows 374, 376, 378 or 378 that transitions in the incoming serialized digital audio data stream are located, the logic circuit 298 makes certain decisions regarding decoding of the serialized digital audio data stream.

It is possible to both identify preambles in the incoming serialized digital audio data stream and identify the type of preamble arriving because of the particular manner in which the preamble is encoded. As more fully described in co-pending PCT application PCT/US03/19392, WO 2004/002060, while the preamble for each subframe of the input digital audio data streams 1 through 4N is 4-bits long and has, therefore, a duration of 4 bit times, the preambles are encoded as a series of four pulses of irregular duration which, length as described in Table I, below.

TABLE I

| Preamble Type | Duration-Pulse 1 | Duration-Pulse 2 | Duration-Pulse 3 | Duration-Pulse 4 |
|---|---|---|---|---|
| "X" | 1.5 bit times | 1.5 bit times | 0.5 bit times | 0.5 bit times |
| "Y" | 1.5 bit times | 1.0 bit times | 0.5 bit times | 1.0 bit times |
| "Z" | 1.5 bit times | 0.5 bit times | 0.5 bit times | 1.5 bit times |

Figure 9:
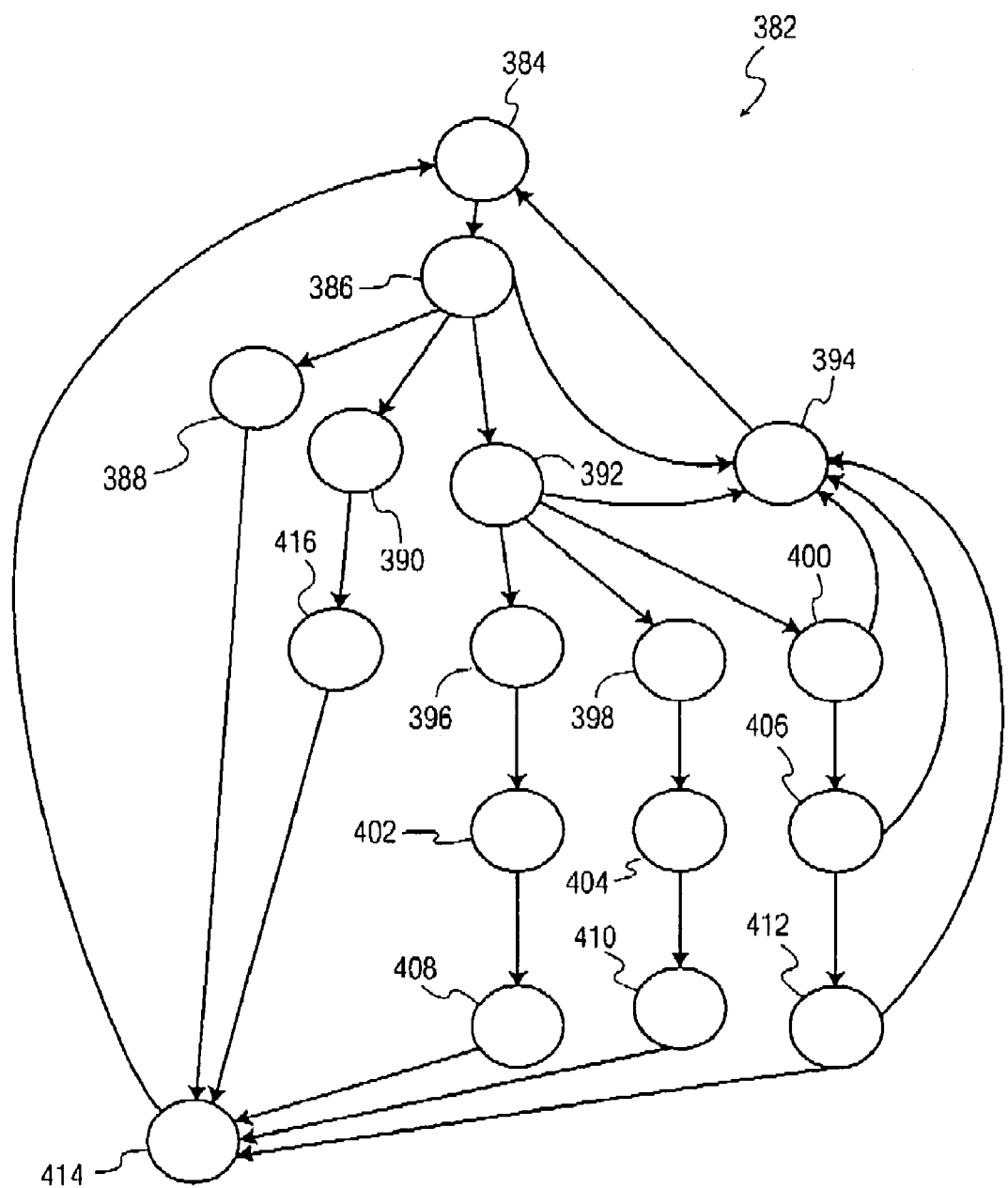
FIG. 9 is a state diagram implemented by a decoding logic circuit of the AES bi-phase decoder of FIG. 4

Referring next to FIG. 9, the process by which the decoding logic circuit 298 decodes the received AES serialized digital audio data stream will now be described in greater detail. The decoding logic circuit 298 is comprised of combinatorial logic configured to execute state diagram 382. The process commences at state 384 with the logic circuit 298 awaiting detection of a first transition in the incoming serialized digital audio data stream. Upon detection of a first transition, the process proceeds to state 386 where the logic circuit 296 begins measuring the time separating the first transition and a subsequent transition in the incoming serialized digital audio data stream. Upon detecting the subsequent transition, the time separating the first transition and the subsequent transition is compared to the timing window 372. If the time separating the transitions is in the first sub-window 374, the process proceeds to state 388 where the decoding logic circuit 298 determines that the detected pulse is a logical "1". If, however, the time separating the transitions is in the second sub-window 376, the process proceeds to state 390 where the decoding logic circuit 298 determines that the detected pulse "may be" a logical "0". If the time separating the transitions is in the third sub-window 378, the process proceeds to state 392 where the decoding logic circuit 298 determines that the detected pulse "may be" a preamble. Finally, if the time separating the transitions is in the fourth sub-window 380, the process proceeds to state 394 where the decoding logic circuit 298 determines that an error has occurred since the detected pulse cannot be decoded. The decoding logic circuit 298 would then re-set the decoding process, decide whether it is necessary to re-measure the estimated bit time, re-measure the estimated bit time if deemed necessary and then return to state 384 to await a next transition.

Returning to state 392, the decoding logic circuit 298 would then await detection of a next transition. If the time separating the transition which enabled the process to proceed to state 392 and the next transition is located in the third sub-window 378, the process would proceed to state 396 where the decoding logic circuit 298 determines that the preamble "may be" an "X" preamble. If, however, the next transition is located in the second sub-window 376, the process would instead proceed to state 398 where the decoding logic circuit 298 would determine that the preamble "may be" a "Y" preamble. Finally, if the next transition is located in the first sub-window 374, the process would proceed to state 400 where the decoding logic circuit 298 would determine that the preamble "may be" a "Z" preamble. Of course, if the next transition is located in the fourth sub-window 380, the process would proceed to state 394 where the decoding logic circuit 298 would again determine that the detected pulse cannot be decoded. The decoding logic circuit 298 would then re-set the decoding process, decide whether it is necessary to re-measure the estimated bit time, re-measure the estimated bit time if deemed necessary and then return to state 384 to await a next transition.

Returning to state 396, the decoding logic circuit 298 would then await detection of a next transition. If the time separating the transition which enabled the process to proceed to state 396 and the next transition is located in the first sub-window 374, the process would proceed to state 402 where the decoding logic circuit 298 would determine that the preamble is "most likely" an "X" preamble. If, however, the next transition is located in either the second, third or fourth sub-windows 376, 378 or 380, the process would proceed, by a transition line not shown for ease of illustration, to state 394 where the decoding logic circuit 298 would again determine that the detected pulse cannot be decoded. The decoding logic circuit 298 would then re-set the decoding process, decide whether it is necessary to re-measure the estimated bit time, re-measure the estimated bit time if deemed necessary and then return to state 384 to await a next transition. Similarly, from state 398, the decoding logic circuit 298 would then await detection of a next transition. If the time separating the transition which enabled the process to proceed to state 398 and the next transition is located in the first sub-window 374, the process would proceed to state 404 where the decoding logic circuit 298 would determine that the preamble is "most likely" a "Y" preamble. If, however, the next transition is located in either the second, third, or fourth sub-windows 376, 378 or 380, the process would be proceed, by a transition line not shown for ease of illustration, to state 394 where the decoding logic circuit 298 would again determine that the detected transition cannot be decoded. The decoding logic circuit 298 would then re-set the decoding process, decide whether it is necessary to re-measure the estimated bit time, re-measure the estimated bit time if deemed necessary and then return to state 384 to await a next transition. Similarly, from state 400, the decoding logic circuit 298 would then await detection of a next transition. If the time separating the transition which enabled the process to proceed to state 400 and the next transition is located in the first sub-window 374, the process would proceed to state 406 where the decoding logic circuit 298 would determine that the preamble is "most likely" a "Z" preamble. If, however, the next transition is located in either the second, third or fourth sub-windows 376, 378 or 380, the process would be instead proceed to state 394 where the decoding logic circuit 298 would again determine that the detected transition cannot be decoded. The decoding logic circuit 298 would then re-set the decoding process, decide whether it is necessary to re-measure the estimated bit time, re-measure the estimated bit time if deemed necessary and then return to state 384 to await a next transition.

Returning to state 402, the decoding logic circuit 298 would then await detection of a next transition. If the time separating the transition which enabled the process to proceed to state 402 and the next transition is located in the first sub-window 374, the process would proceed to state 408 where the decoding logic circuit 298 would conclude that the preamble is an "X" preamble. If, however, the next transition is located in either the second, third or fourth sub-windows 376, 378 or 380, the process would proceed, by a transition line not shown for ease of illustration, to state 394 where the decoding logic circuit 298 would again determine that the detected transition cannot be decoded. The decoding logic circuit 298 would then re-set the decoding process, decide whether it is necessary to re-measure the estimated bit time, re-measure the estimated bit time if deemed necessary and then return to state 384 to await a next transition. Similarly, from state 404, the decoding logic circuit 298 would then await detection of a next transition. If the time separating the transition which enabled the process to proceed to state 404 and the next transition is located in the second sub-window 376, the process would proceed to state 410 where the decoding logic circuit 298 would conclude that the preamble is a "Y" preamble. If, however, the next transition is located in either the first, third, or fourth sub-windows 374, 378 or 380, the process would be proceed, by a transition line not shown for ease of illustration, to state 394 where the decoding logic circuit 298 would again determine that the detected transition cannot be decoded. The decoding logic circuit 298 would then re-set the decoding process, decide whether it is necessary to re-measure the estimated bit time, re-measure the estimated bit time if deemed necessary and then return to state 384 to await a next transition. Finally, from state 406, the decoding logic circuit 298 would then await detection of a next transition. If the time separating the transition which enabled the process to proceed to state 406 and the next transition is located in the third sub-window 378, the process would proceed to state 412 where the decoding logic circuit 298 would conclude that the preamble is a "Z" preamble. If, however, the next transition is located in the fourth sub-window 380, the process would be instead proceed to state 394 where the decoding logic circuit 298 would again determine that the detected transition cannot be decoded. The decoding logic circuit 298 would then re-set the decoding process, decide whether it is necessary to re-measure the estimated bit time, re-measure the estimated bit time if deemed necessary and then return to state 384 to await a next transition.

After either concluding that the preamble is an "X" preamble at state 408, a "Y" preamble at state 410 or a "Z" preamble at state 412, the process proceeds to state 414 where the decoding logic circuit 298 transfers the preamble to the FIFO memory 302 which, as disclosed herein, is a 32-bit wide register. Upon commencing the extraction of digital audio data from the received AES serialized digital audio data stream, the decoding logic circuit 298 will place the first such decoded preamble, typically, a type "Z" preamble, into bits 31-28 of the FIFO memory 302. The process will then return to state 384 to await a next transition. Upon detecting another transition, the process would again proceed to state 386 where the decoding logic circuit 298 would again begin measuring the time separating the detected transition and a subsequent transition in the incoming serialized digital audio data stream. Upon detecting the subsequent transition, the time separating the detected transition and the subsequent transition is compared to the timing window 372.

Upon detecting the subsequent transition, the time separating the detected transition and the subsequent transition is compared to the timing window 372. As previously stated, if the time separating the transitions is in the first sub-window 374, the process proceeds to state 388 where the decoding logic circuit 298 determines that the detected pulse is a logical "1". The process would then proceed to state 414 where the decoding logic circuit 298 transfers the decoded data bit into bit 31 of the FIFO memory 302, thereby causing the first decoded preamble to be moved into bits 30-27 of the FIFO memory 302. If, however, the time separating the transitions is in the second sub-window 374, as also previously stated, the process instead proceeds to state 390 where the decoding logic circuit 298 determines that the detected pulse "may be" a zero. The decoding logic circuit 298 would then await detection of a next transition. If the time separating the transition which enabled the process to proceed to state 390 and the next transition is located in the second sub-window 376, the process would proceed to state 416 where the decoding logic circuit 298 would conclude that the detected data bit is a logical "0". If, however, the next transition is located in either the first, third, or fourth sub-windows 374, 378 or 380, the process would proceed, by a transition line not shown for ease of illustration, to state 394 where the decoding logic circuit 298 would again determine that the detected transition cannot be decoded. The decoding logic circuit 298 would then re-set the decoding process, decide whether it is necessary to re-measure the estimated bit time, re-measure the estimated bit time if deemed necessary and return to state 384 to await a next transition.

Upon concluding that the detected data bit is a logical "0" at step 416, the process proceeds to state 414 where the decoding logic circuit 298 transfers the decoded data bit into bit 31 of the FIFO memory 302, thereby causing the first decoded preamble to be moved into bits 30-27 of the FIFO memory 302. The process would then return to state 384 to await a next transition, proceed to state 386 upon detecting a next transition to begin measuring the time separating the detected transition and a subsequent transition in the incoming serialized digital audio data stream and again compare the time separating the detected transition and the subsequent transition is compared to the timing window 372.

As described more fully in the AES-3 standard, in bi-phase encoding, each bit to be transmitted is represented by a symbol comprising two consecutive binary states. The first state of a symbol is always different from the second state of the previous symbol. In addition, the second state of the symbol is identical to the first state of the symbol if the bit to be transmitted is a logical "0". However, the second state of the symbol shall be different from the first state if the bit to be transmitted is a logical "1". Thus, in the foregoing description of the identification of a detected data bit as a logical "0", it should be noted that, because data is encoded in bi-phase, a logical "0" is characterized by two transitions while a logical "1" is characterized by only one transition.

Thus, as the logic circuit 298 decodes, in succession, individual bits of data in the received stream of serialized AES digital audio data, each such bit will be identified as either a logical "1", a logical "0" or as part of a preamble. As each data bit is successfully identified, it is transferred into bit 31 of the FIFO 302, thereby gradually filling the FIFO 302 with a first 32-bit subframe of AES digital data. Whenever another preamble is subsequently identified, however, the decoding logic circuit 298 concludes that it has begun to decode a next 32-bit subframe of AES digital data. Accordingly, the existing contents of the FIFO 302 are clocked into the selector circuit 138-1 and the newly identified preamble is placed into bits 31-28 of the FIFO 302, thereby beginning the filling of the FIFO 302 with a next 32-bit subframe of AES digital data. Of course, independently placing each subframe in the FIFO 302 is but one suitable method. Alternately, a 64-bit wide FIFO capable of holding both subframes may instead be used.

It is further contemplated that the AES bi-phase decoder 296-1 also include lock and re-measure functionality. Lock is achieved whenever such functionality determines that the estimated bit time is suitable for continued use. Periodically, however, the AES bi-phase decoder 296-1 will instead determine the estimated bit time is not suitable for further use and, when the lock and re-measure functionality makes such a determination, it will initiate re-measurement of the estimated bit time. For example, re-measurement will often occur as part of the aforementioned reset process which takes place during the transition from the state 394 to the state 384. This lock and re-measurement functionality is important to assist the decoding logic circuit 298 to enter a valid state.

Generally, it is contemplated that the decoding logic circuit 298 will either be in a valid or an invalid state. In the valid state, the decoding logic circuit 298 will perform those operations previously described in detail. When in the invalid state, however, the decoding logic circuit 298 will not perform the aforementioned operations. Normally, the decoding logic circuit 298 is in the valid state. When the state machine 382 enters the error state 394, however, the decoding logic circuit 298 switches into the invalid state. The reset process enables the decoding logic circuit 298 to re-enter the valid state. Thus, to re-enter the valid state, the decoding logic circuit 298 must successfully execute the reset process described below. As previously set forth, the decoding logic circuit 298 is configured to operate in either a first mode in which the estimated bit time is user-selected for direct input to the decoding logic circuit 298 or in a second mode in which the estimated bit time automatically generated from the incoming AES serialized digital audio data stream, for example, by the bit time estimator 300.

More specifically, to start the reset process, the decoding logic circuit 298 checks its operating mode and, if operating in the second mode, instructs the bit time estimator 300 to begin a re-measurement of the estimated bit time using the method previously described with respect to FIG. 4. The decoding logic circuit 298 will then await the arrival of a newly determined value for the estimated bit time. If, however, the decoding logic circuit 298 is operating in the first mode, re-measurement (or, in this case, measurement of the estimated bit time) is not necessary at this stage in the reset process.

Upon arrival of the new determined value for the estimated bit time from the bit time estimator 300, or if the decoding logic circuit 298 is operating in the first mode, the decoding logic circuit 298 will await the arrival of a preamble. After a preamble has been detected, the decoding logic circuit 298 will begin counting bits. If a next preamble is not detected within 48 bits of the prior detected preamble, a missing preamble will be declared and the decoding logic circuit 298 will instruct the bit time estimator 300 to re-determine the estimated bit time (or, if the decoding logic circuit 298 is operating in the first mode, determine the estimated bit time). If, however, the next preamble is received within the aforementioned bit count, the decoding logic circuit 298 will assert a lock bit indicating that the bi-phase decoder 296-1 has been locked to the correct bit time and, by doing so, the decoding logic circuit 298 will re-enter the valid state, thereby completing the reset process and enabling resumption of the aforedescribed decoding process. Thus, depending on the operating mode of the decoding logic circuit 298 and the ability of the decoding logic circuit 298 to correctly predict the time of arrival for a preamble, the reset process may or may not involve a re-determination of the estimated bit time.

The decoding logic circuit 298 will, however, continue to check that each successive preamble is timely received and, if a preamble does not arrive timely, decoding logic circuit 298 will deassert the lock bit, thereby entering the invalid state and interrupting the decoding process. As before, the decoding logic circuit 298 will then instruct the bit time estimator 300 to re-determine (or determine) the estimated bit time thereby enabling a return to the valid state as quickly as possible. By doing so, a switch between two signals of the same sample rate can take place upstream without causing a re-measure. Of course, it should be noted that the 48 bit count (which equates to allowing the preamble 50% more time to arrive) disclosed herein is purely exemplary and other bit counts are suitable for the purposes disclosed herein.

Thus, there has been disclosed and illustrated herein a bi-phase decoder suitable for use in broadcast routers and an associated method for extracting 32-bit wide data subframes from an incoming AES-3 digital audio data stream. Of course, while preferred embodiments of this invention have been shown and described herein, various modifications and other changes can be made by one skilled in the art to which the invention pertains without departing from the spirit or teaching of this invention. Accordingly, the scope of protection is not limited to the embodiments described herein, but is only limited by the claims that follow.

The invention claimed is:

1. A method of extracting digital audio data words from a serialized stream of digital audio data, comprising:
    constructing a timing window from an estimated bit time for said serialized stream of digital audio data, said timing window having a preamble sub-window and at least one data sub-window;
    extracting plural digital audio data words from said serialized stream of digital audio based upon the location of each transition in said serialized stream of digital audio data relative to said preamble sub-window and said at least one data sub-window of said timing window;
    each one of said extracted plural digital audio data words having a preamble identifiable by a combination of at least one transition located in said preamble sub-window of said timing window and at least one transition located in said at least one data sub-window of said timing window;
    wherein said bit time is estimated by averaging a plurality of data stream pulse lengths and the time separating a first set of successive identified transitions is a first measurement of said estimated bit time.

2. The method of claim 1, and further comprising identifying said extracted data words as having a first type of preamble if said extracted data words have a pair of successive transitions located in said preamble sub-window followed by a pair of successive transitions located in said at least one data sub-window.

3. The method of claim 2, and further comprising identifying said extracted data words as having a second type of preamble if said extracted data words have a pair of non-successive transitions located in said preamble sub-window separated by a pair of successive transitions located in said at least one data sub-window.

4. The method of claim 3, and further comprising identifying said extracted data words as having a third type of preamble if said extracted data words have a transition located in said preamble sub-window followed by first, second and third transitions located in said at least one data sub-window.

5. The method of claim 4, wherein said timing window is constructed such that said preamble sub-window extends from about 1¼ times said estimated bit time to about 1¾ times said estimated bit time.

6. The method of claim 5, wherein said timing window is constructed such that said at least one data sub-window extends from about ¼ times said estimated bit time to about 1¼ times said estimated bit time.

7. The method of claim 4, wherein said timing window is constructed such that said at least one data sub-window includes a first data sub-window which extends from about ¼ times said estimated bit time to about ¾ times said estimated bit time and a second data sub-window which extends from about ¾ times said estimated bit time to about 1¼ times said estimated bit time.

8. The method of claim 1, wherein said estimated bit time is derived from said serialized stream of digital audio data.

9. The method of claim 8, and further comprising:
    estimating minimum and maximum bit window times;
    constructing a bit window from said minimum and maximum bit window times;
    identifying transitions in said serialized stream of digital audio data which occur within said constructed bit window.

10. The method of claim 9, and further comprising determining said estimated bit time from a running average of plural measurements of said estimated bit time.

11. A method of extracting digital audio data words from a serialized stream of digital audio data, comprising:
    constructing a timing window from an estimated bit time for said serialized stream of digital audio data, said timing window having a preamble sub-window and at least one data sub-window;
    sampling said serialized stream of digital audio data at a fast sample rate; and
    extracting plural digital audio data words from said serialized stream of digital audio based upon the location of each transition in said sampled stream of digital audio data relative to said preamble sub-window and said at least one data sub-window of said timing window;
    wherein said bit time is estimated by averaging a plurality of data stream pulse lengths and the time separating a first set of successive identified transitions is a first measurement of said estimated bit time.

12. The method of claim 11, wherein said fast sample rate is at least about twenty times faster than a data rate for said serialized stream of digital audio data.

13. The method of claim 12, wherein said fast sample rate is derived from a fast clock having a frequency of at least about twenty times faster than the frequency of said serialized stream of digital data.

14. The method of claim 13, wherein each one of said extracted plural digital audio data words has a preamble identifiable by a combination of at least one transition located in said preamble sub-window of said timing window and at least one transition located in said at least one data sub-window of said timing window.

15. The method of claim 14, and further comprising identifying said extracted data words as having a first type of preamble if said extracted data words have a pair of successive transitions located in said preamble sub-window followed by a pair of successive transitions located in said at least one data sub-window.

16. The method of claim 15, and further comprising identifying said extracted data words as having a second type of preamble if said extracted data words have a pair of non-successive transitions located in said preamble sub-window separated by a pair of successive transitions located in said at least one data sub-window.

17. The method of claim 16, and further comprising identifying said extracted data words as having a third type of preamble if said extracted data words have a transition located in said preamble sub-window followed by first, second and third transitions located in said at least one data sub-window.

18. The method of claim 17, wherein said estimated bit time is derived from said serialized stream of digital audio data.

19. The method of claim 18, and further comprising:
estimating minimum and maximum bit window times;
constructing a bit window from said minimum and maximum bit window times;
identifying transitions in said serialized stream of digital audio data which occur within said constructed bit window, the time separating a set of successive identified transitions being a measurement of said estimated bit time.

20. A bi-phase decoder for use in decoding a stream of AES-3 digital audio data, comprising:
a decoder circuit coupled to receive a stream of AES-3 digital audio data, an estimated bit time for said stream of AES-3 digital audio data and a fast clock, said fast clock having a frequency of about at least twenty times faster than a frequency of said stream of AES-3 digital audio data; and
a data store coupled to said decoder circuit, said data store receiving subframes of digital audio data extracted, from said stream of AES-3 digital audio data by said decoder circuit;
said decoder circuit extracting subframes of said digital audio data by constructing a timing window from said estimated bit time, sampling said stream of AES-3 digital audio data using said fast clock and applying said sampled stream of AES-3 digital audio data to said timing window to identify transitions, in said sampled stream of AES-3 digital audio data, indicative of preambles of said subframes of digital audio data;
wherein said bit time is estimated by averaging a plurality of data stream pulse lengths and the time separating a first set of successive identified transitions is a first measurement of said estimated bit time.

21. The apparatus of claim 20, wherein said constructed timing window has a preamble sub-window and at least one data sub-window and wherein preambles of said subframes of digital audio data are indicated by a combination of at least one transition located in said preamble sub-window and at least one transition located in said at least one data sub-window.

22. The apparatus of claim 21, and further comprising a bit time estimator circuit having an input coupled to receive said stream of AES-3 digital audio data and an output coupled to said decoder circuit, said bit time estimator determining said estimated bit time for output to said decoder circuit.

23. A method of extracting digital audio data words from a serialized stream of digital audio data, comprising:
constructing a timing window from an estimated bit time for said serialized stream of digital audio data, said timing window having a preamble sub-window and at least one data sub-window;
extracting plural digital audio data words from said serialized stream of digital audio based upon the location of each transition in said serialized stream of digital audio data relative to said preamble sub-window and said at least one data sub-window of said timing window;
each one of said extracted plural digital audio data words having a preamble identifiable by a combination of at least one transition located in said preamble sub-window of said timing window and at least One transition located in said at least one data sub-window of said timing window
estimating minimum and maximum bit window times;
constructing a bit window from said minimum and maximum bit window times;
identifying transitions in said serialized stream of digital audio data which occur within said constructed bit window, wherein the time separating a fast set of successive identified transitions is a first measurement of said estimated bit time
wherein said bit time is estimated by averaging a plurality of data stream pulse lengths and the time separating a first set of successive identified transitions is a first measurement of said estimated bit time.

24. A method of extracting digital audio data words from a serialized stream of digital audio data, comprising:
constructing a timing window from an estimated bit time for said serialized stream of digital audio data, said timing window having a preamble sub-window and at least one data sub-window;
sampling said serialized stream of digital audio data at a fast sample rate; and
extracting plural digital audio data words from said serialized stream of digital audio based upon the location of each transition in said sampled stream of digital audio data relative to said preamble sub-window and said at least one data sub-window of said timing window;
estimating minimum and maximum bit window times;
constructing a bit window from said minimum and maximum bit window times;
identifying transitions in said serialized stream of digital audio data which occur within said constructed bit window, the time separating a set of successive identified transitions being a measurement of said estimated bit time; and
determining said estimated bit time from a running average of plural measurements of said estimated bit time.

* * * * *